June 12, 1951 — A. J. SMITH — 2,556,947
ADJUSTABLE WHEEL DOLLY FOR ATTACHMENT TO CHAIRS
Filed May 8, 1950 — 2 Sheets-Sheet 2
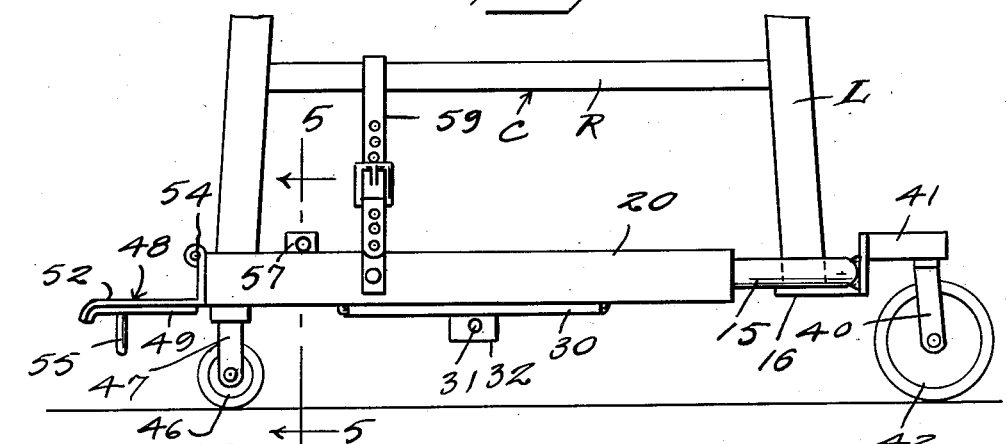
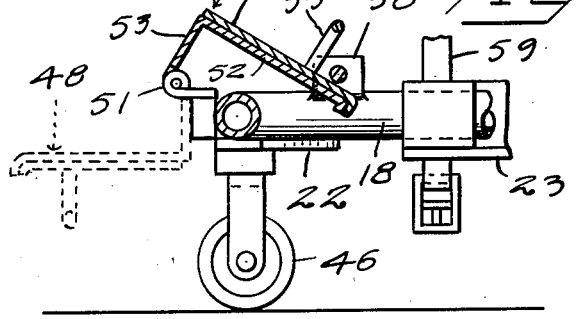
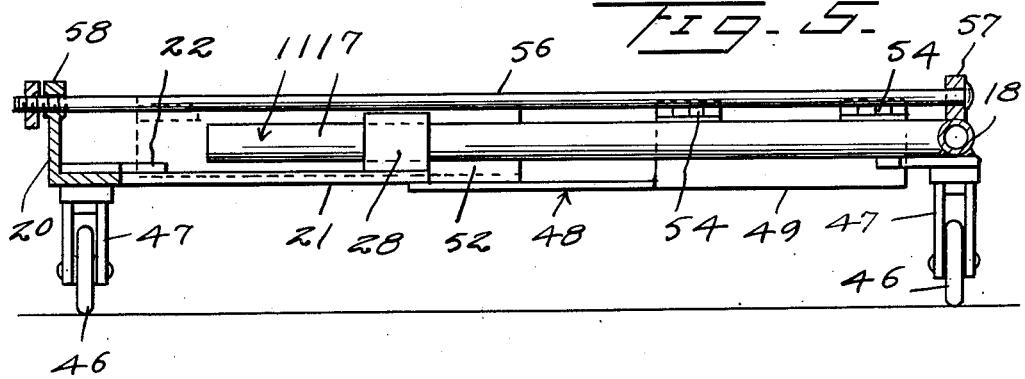
INVENTOR
A. J. Smith
BY Kimmel & Crowell
ATTORNEYS Patented June 12, 1951

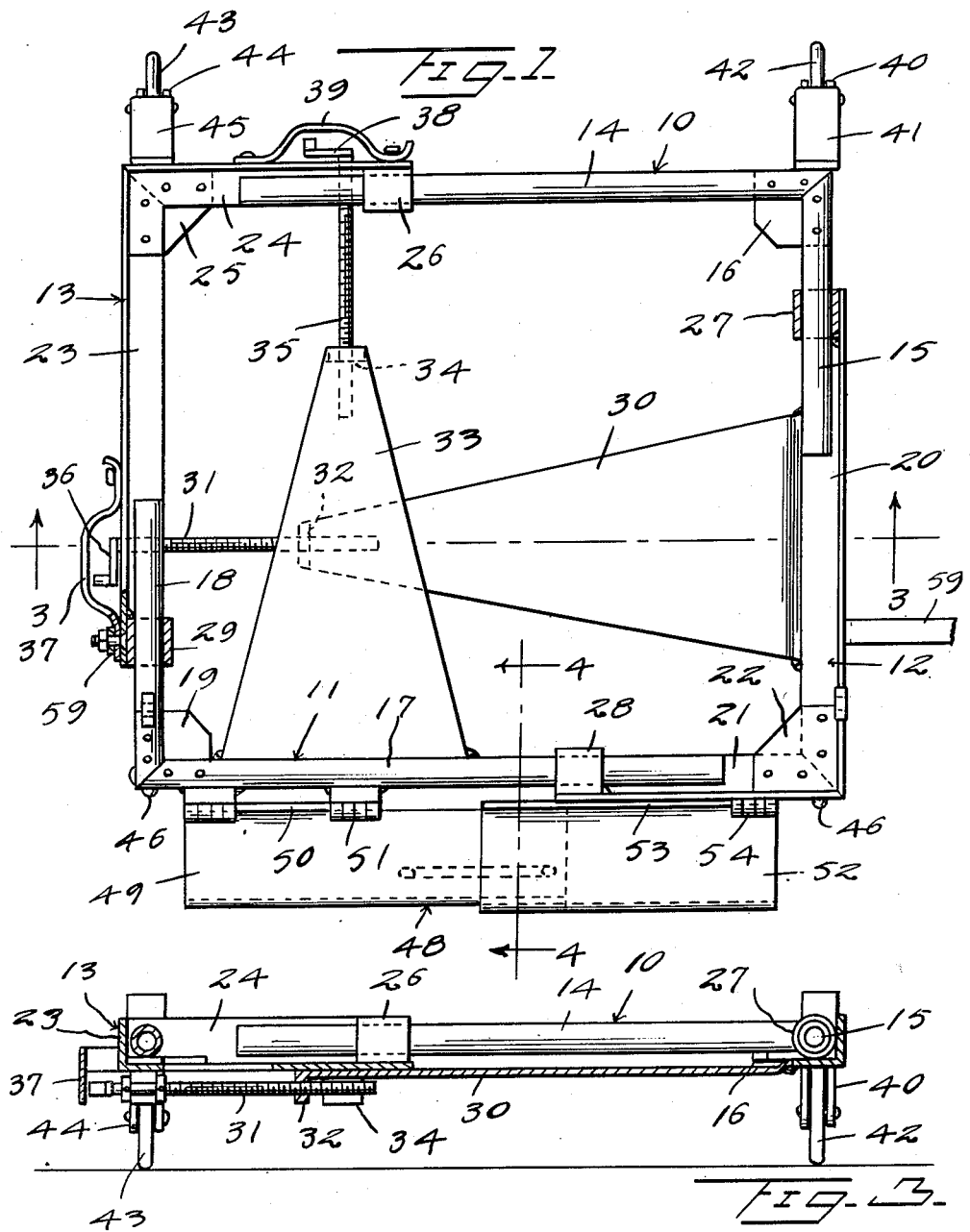

2,556,947

UNITED STATES PATENT OFFICE 2,556,947

ADJUSTABLE WHEEL DOLLY FOR ATTACHMENT TO CHAIRS

Anthony J. Smith, Oxford, Nebr.

Application May 8, 1950, Serial No. 160,698

2 Claims. (Cl. 280—35)

This invention relates to a dolly adapted to be secured to a chair.

An object of this invention is to provide a dolly which can be secured to the bottom of a chair so as to transform a conventional chair into a wheeled chair.

Another object of this invention is to provide a dolly of this kind which is adjustable as to size so that it can be adapted to chairs of different sizes.

A further object of this invention is to provide a dolly of this kind which is of simple construction and can be made out of light weight material.

With the above and other objects in view, my invention consists in the arrangement, combination and details of construction disclosed in the drawings and specification, and then more particularly pointed out in the appended claims.

In the drawings:

Figure 1 is a plan view of a dolly or truck constructed according to an embodiment of this invention.

Figure 2 is a detailed side elevation of the device.

Figure 3 is a sectional view taken on the line 3—3 of Figure 1.

Figure 4 is a fragmentary sectional view taken on the line 4—4 of Figure 1.

Figure 5 is a sectional view taken on the line 5—5 of Figure 2.

Referring to the drawings, the numerals 10 and 11 designate generally a pair of L-shaped frame members and the numerals 12 and 13 designate a second pair of frame members. The frame member 10 is formed of an elongated rear bar 14 and a right angularly disposed side bar 15 with a plate 16 fixed at the junction of the angle between the two bars 14 and 15. The plate 16, not only constitutes a bracing means for the two bars 14 and 15, but also constitutes a seat or support for one leg L of a chair. The frame member 11 is formed of an elongated forward bar 17 and a relatively short side bar 18 with a combined bracing end leg supporting plate 19 fixed to the bars 17 and 18 at the junction thereof. The frame member 12 is formed of an elongated angle bar 20 forming a side bar which is disposed in parallel relation with respect to the side bar 15, and frame member 12 also includes a front angle bar 21 which is braced relative to the side bar 20 by means of a bracing plate 22. The bracing plate 22 also constitutes a seat or support for another leg of the chair.

The frame member 13 comprises an elongated side angle bar 23 disposed parallel with the side bar 18 and also includes a right angularly disposed rear bar 24 which is parallel with the rear bar 14. A plate 25 is fixed to the wheel frame bars 23 and 24 and constitutes a brace as well as a leg supporting member. The rear bar 24 has a tubular member 26 fixed thereto which slidably engages the rear bar 14, and the side bar 20 has fixed thereto a tubular slide member 27 which slidably engages the side bar 15.

The front bar 21 has fixed thereto a tube or sleeve 28 which slidably engages the front bar 17 of frame member 11. The side bar 23 has fixed thereto a tube or sleeve 29 which loosely engages about the side bar 18. In order to provide a means whereby the frame structure formed of the frame members 10, 11, 12, and 13 may be enlarged or restricted in size, I have provided an elongated plate 30 which is fixed to the side bar 20 and projects inwardly in the direction of side bars 18 and 23. Side bar 23 has journalled therethrough a screw shaft 31 which is threaded into a nut 32 carried by the inner end of plate 30. A second elongated plate 33 is fixed to the front bar 17 projecting rearwardly and formed with a nut 34 at its rear end. A screw shaft 35 is rotatably carried by the rear bar 24 and is threaded into the nut 34.

Screw shaft 31 has a crank or handle 36 secured thereto which is substantially covered by means of a pivoted guard 37 carried by the side bar 23. The screw shaft 35 has fixed to the rear end thereof a crank or a handle 38, and the handle 38 is normally protected and substantially enclosed by means of a bowed and pivoted guard 39 which is carried by the rear bar 24. The rear frame member 10 has projecting rearwardly therefrom a wheel fork 40 which is swivelly secured to a rearwardly projecting arm 41 fixedly carried by the frame member 10, and the fork 40 has a wheel 42 rotatably disposed between the arms thereof.

A second rear wheel 43 is rotatably carried by a fork 44 which is swivelly carried by a second rearwardly projecting arm 45. The arm 45 is fixed to the frame member 13. A front pair of wheels 46 are rotatably carried by forks 47 which are fixedly secured one fork to each of the frame members 11 and 12. A foot rest generally designated as 48 is disposed at the front end of the dolly structure and includes a plate 49 having a right angle rear extension 50 which is hingedly secured as at 51 to the front frame bar 17.

A second plate 52 is adapted to overlap the plate 49 and is formed with a right angular rear extension 53 which is hingedly secured as at 54 to the front frame bar 21. A handle or bail 55 is fixed to the lower side of the plate 49 and provides a means whereby the front of the dolly structure may be raised or carried when the foot rest 48 is swung upwardly and rearwardly to an inoperative position as shown in Figure 4. The foot rest structure is fixed in its inoperative position by means of an elongated bar or bolt 56 which engages through lugs 57 and 58 carried by the frame bars 18 and 20, respectively. When the bar 56 is disposed through the lugs 57 and 58, the dolly structure is in substantially collapsed condition. The chair C is adapted to be firmly secured on the supporting plates 16, 19, 22, and 25 by means of a pair of flexible straps 59 which are fixed to the opposite sides of the frame structure and are adapted to engage over rungs R secured between adjacent pairs of legs of the chair.

In the use and operation of this dolly structure, the frame is adjusted as to size by means of the screw shafts 31 and 35. The frame structure is adjusted so that the legs L of the chair may readily engage the supporting plates 16, 19, 22, and 25 of the dolly structure. When the frame of the dolly has been adjusted as to size, the chair may be firmly secured in the frame structure by means of the straps 59. The dolly structure will provide a means whereby a conventional chair may be converted into a wheel chair and whereby the person sitting in the chair may rest his feet on the foot rest while seated in the chair.

What is claimed is:

1. A dolly comprising an adjustable polygonal frame formed of a plurality of L-shaped members, means adjustably securing said members together, a plate fixed to one of said members and extending transversely of said frame, a nut carried by said plate, a screw shaft rotatably carried by said frame oppositely from said plate threaded into said nut, a second plate fixed to said frame at right angles to said first plate and intersecting the latter, a nut fixed to said second plate, a second screw shaft carried by said frame opposite from said second plate and threaded into said second nut, and wheels rotatably carried by said frame.

2. A dolly comprising an adjustable polygonal frame fomed of a plurality of L-shaped members, means adjustably securing said members together, a plate fixed to one of said members and extending transversely of said frame, a nut carried by said plate, a screw shaft rotatably carried by said frame oppositely from said plate threaded into said nut, a second plate fixed to said frame at right angles to said first plate and intersecting the latter, a nut fixed to said second plate, a second screw shaft carried by said frame opposite from said second plate and threaded into said second nut, handles carried by the outer ends of each of said screw shafts, guard plates pivotally connected to said frame adjacent each of said handles to overlie the same to protect them against accidental movement, and wheels rotatably carried by said frame.

ANTHONY J. SMITH.

REFERENCES CITED

The following references are of record in the file of this patent:

UNITED STATES PATENTS

| Number | Name | Date |
|---|---|---|
| 211,828 | Ash | Feb. 4, 1879 |
| 223,017 | Tucker et al. | Dec. 30, 1879 |
| 1,543,626 | Stansbury | June 23, 1925 |
| 1,642,094 | Sviageninov | Sept. 13, 1927 |